(12) United States Patent
La Terra

(10) Patent No.: US 6,213,515 B1
(45) Date of Patent: Apr. 10, 2001

(54) HYDRANT SERVICER CART

(75) Inventor: Bruno P La Terra, Melbourne (AU)

(73) Assignee: National Valve & Engineering Company Pty. Ltd., Waterloo (AU)

( * ) Notice: Subject to any disclaimer, the term of this patent is extended or adjusted under 35 U.S.C. 154(b) by 0 days.

(21) Appl. No.: 09/402,272

(22) PCT Filed: May 3, 1999

(86) PCT No.: PCT/AU99/00326

§ 371 Date: Sep. 30, 1999

§ 102(e) Date: Sep. 30, 1999

(87) PCT Pub. No.: WO99/36316

PCT Pub. Date: Jul. 22, 1999

(30) Foreign Application Priority Data

Sep. 4, 1998 (AU) .................................................. PP5715

(51) Int. Cl.[7] .................. B67D 5/01; B64F 1/28
(52) U.S. Cl. .................. 280/834; 280/4; 141/387; 141/279; 137/351; 182/113
(58) Field of Search .................. 280/4, 838, 830, 280/831, 836, 834; 141/231, 387, 388, 279; 137/615, 351; 182/113

(56) References Cited

U.S. PATENT DOCUMENTS

| 2,196,511 | * | 4/1940 | Wagner et al. . | |
|---|---|---|---|---|
| 2,787,278 | * | 4/1957 | Mitchell . | |
| 2,888,299 | * | 5/1959 | Balogh . | |
| 3,648,720 | * | 3/1972 | Kornahrens | 137/351 X |
| 4,202,372 | * | 5/1980 | Gibbons | 137/615 |
| 4,653,554 | * | 3/1987 | Von Meyerinck et al. | 137/615 X |
| 4,658,873 | * | 4/1987 | Von Meyerinck et al. | 137/615 X |
| 4,844,133 | * | 7/1989 | von Meyerinck et al. | 137/615 X |
| 4,886,282 | * | 12/1989 | Wilkinson et al. | 137/351 X |
| 4,898,211 | * | 2/1990 | Fournier et al. | 137/615 |
| 5,305,805 | * | 4/1994 | Watkins, Jr. | 141/231 |

FOREIGN PATENT DOCUMENTS

| 0394543 | * | 5/1989 | (EP) | B64F/1/28 |
|---|---|---|---|---|
| 409175259 | * | 7/1997 | (JP) | B60P/3/00 |

* cited by examiner

*Primary Examiner*—J. J. Swann
*Assistant Examiner*—F. Zeender
(74) *Attorney, Agent, or Firm*—Edwin D. Schindler

(57) ABSTRACT

An aircraft refuelling cart includes a chassis (10) having ground-engaging wheels (11, 12) and a refuelling platform (20) upon which an aircraft refuelling operator can stand. The platform (20) is mounted to the chassis (10) by a scissor-action mechanism (22) which is typically activated by hydraulic means. An extendable hydrant hose (14) has a coupler (15) for connection to an airport fuel hydrant. A fuel conveying boom (24) conveys fuel from the hydrant hose to one or more fuel hoses (26) at the platform (20). The fuel hoses (26) convey fuel to the aircraft. The fuel cart can remain on the apron at a particular aircraft bay and is readily movable from one side of the aircraft to the other and is capable of servicing the full range of aircraft which may use the bay at which it is stationed. This is achieved by way of the variable height adjustability of the platform (20).

8 Claims, 4 Drawing Sheets

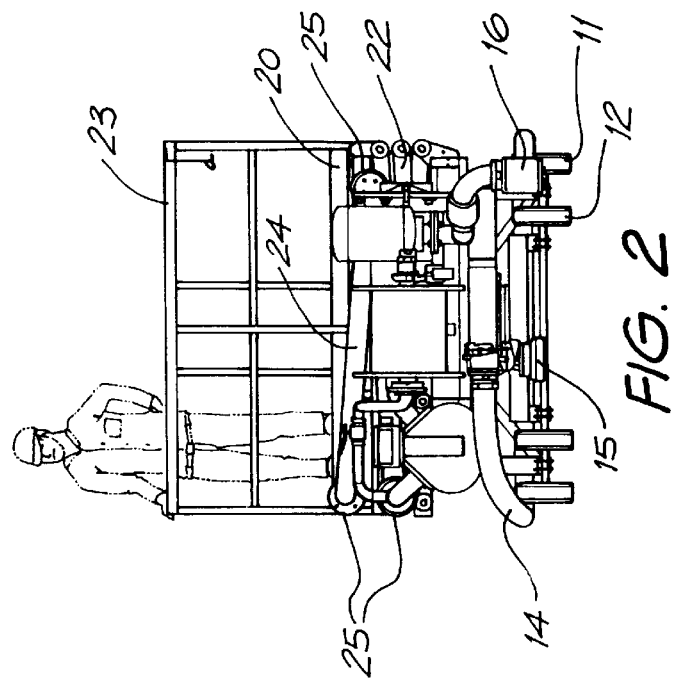
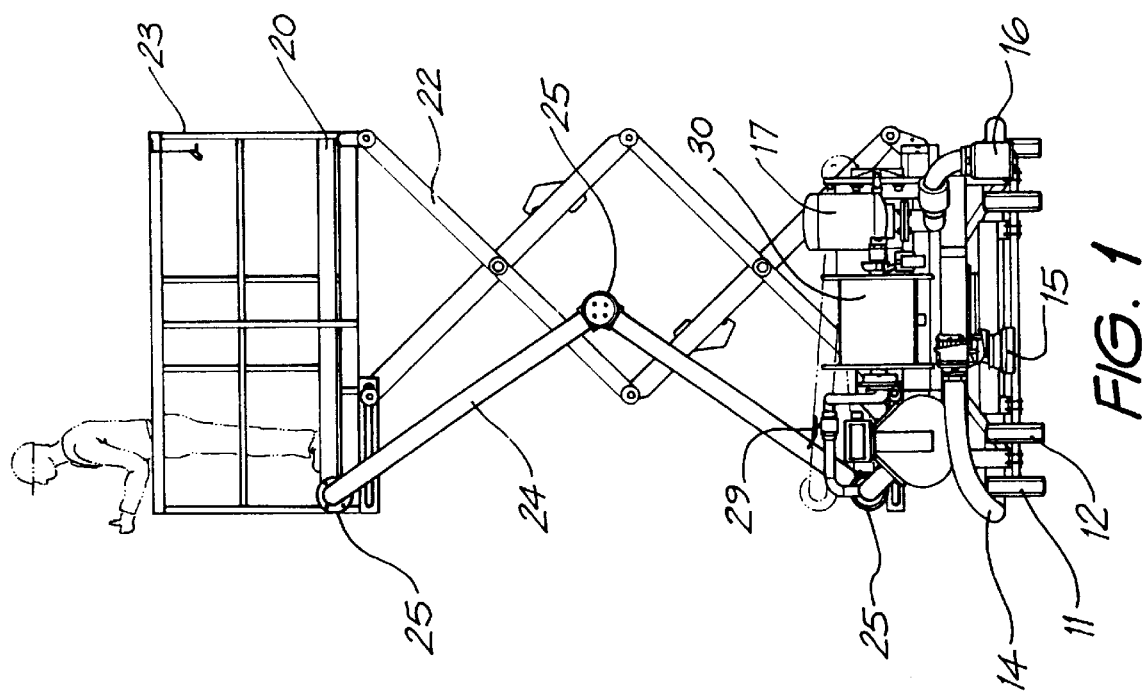

HYDRANT SERVICER CART

FIELD OF THE INVENTION

This invention relates to hydrant servicer carts, used in the refuelling of aircraft from pressurised underground mains accessed by hydrants at the loading/unloading aprons of airports.

OBJECT OF THE INVENTION

The invention seeks to meet the need for a servicer cart which can remain on the apron at a particular bay while being readily movable from one side of the aircraft to the other, and is capable of servicing the full range of aircraft which may use the bay at which it is stationed. Carts according to the preferred embodiments of the invention meet these requirements, while being readily maneuvered by a single operator, typically having self-propulsion for ordinary operating needs and being towable for maintenance.

DISCLOSURE OF THE INVENTION

There is disclosed herein an aircraft refuelling cart including:

a chassis having ground-engaging wheels, a refuelling platform for supporting an aircraft refuelling person or persons and being mounted to the chassis, means for raising and lowering the platform with respect to the chassis, a hydrant hose having a coupler for connection to an airport fuel hydrant, a fuel conveying boom which receives fuel from said hydrant hose, the boom being vertically extendable and retractable and capable of conveying said fuel, and a fuel hose coupled to an upper end of said boom and receiving fuel therefrom, the hose including fuel delivery means accessible by an aircraft refuelling person upon the platform for attachment to an aircraft to convey fuel thereto.

Preferably, the refuelling platform is mounted to the chassis by means of one or more scissor-action mechanisms, each including a plurality of pivotally interconnected support members.

Preferably, the boom includes a plurality of rigid segments pivotally coupled end-to-end.

Preferably, each segment of the boom resides adjacent to and is substantially parallel and co-extensive with a respective one of said support members.

Alternatively, the support members of the or each scissor-action mechanism pivot about respective parallel pivot axes and each segment of the boom resides in a plane or planes which is/are substantially parallel to said pivot axes.

Preferably, the platform includes hand rails which are pivotally collapsible.

Preferably, the boom is partly supported by the platform.

Alternatively, the boom is independent of the platform, such a boom being independently operable, avoiding the need to maintain the platform at operating height throughout the refuelling process.

Carts as disclosed herein present a small footprint but are capable of refuelling the full range of high-wing aircraft currently in use at major airports.

BRIEF DESCRIPTION OF THE DRAWINGS

Preferred forms of the invention will now be described, by way of example only, with reference to the accompanying drawings, in which:

FIG. 1 is an end elevation of a servicer cart incorporating the invention in a first embodiment, showing the platform raised but also showing the lowered position of the folding boom;

FIG. 2 is an end elevation of the cart of FIG. 1 with the platform fully lowered;

DESCRIPTION OF THE PREFERRED EMBODIMENTS

Figure 3:
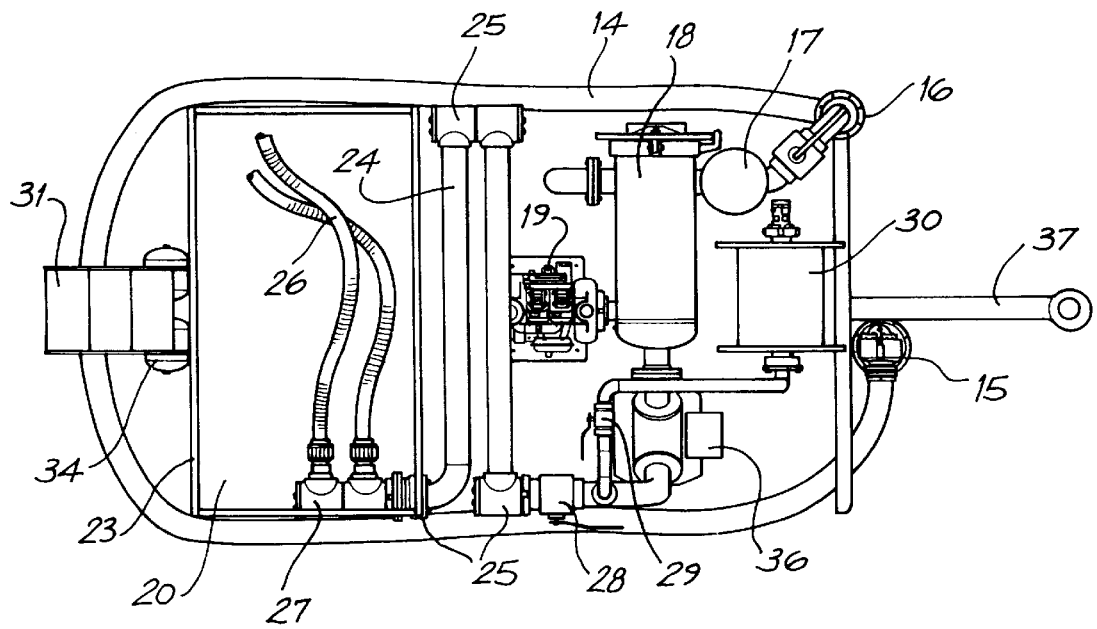
FIG. 3 is a plan view of the cart of FIG. 1.

The cart illustrated in FIGS. 1–4 includes a chassis 10 carried on rear wheels 11 and a front wheels 12, the latter being mounted on a turntable 13 enabling steering, and is provided with a retractable drawbar 37 engaged with the turntable 13.

Mounted on the chassis are components conventionally required in hydrant refuelling vehicles, including a hydrant hose 14 removably supported around the periphery of the cart, hydrant coupler 15, an inlet valve 16, surge suppressor 17, filter 18, and fuel meter 36. A diesel engine 19 is fitted with a hydraulic pump to provide power to hydraulic motors (not shown) at both of the rear cart wheels, preferably both rear wheels, enabling the vehicle to be self-propelled, and to provide fluid to the rams controlling the raising and lowering of the refuelling platform 20. The engine 19 also operates an air compressor 21 for operation of the hydrant valve, although this may be substituted by a product-driven compressor.

Figure 4:
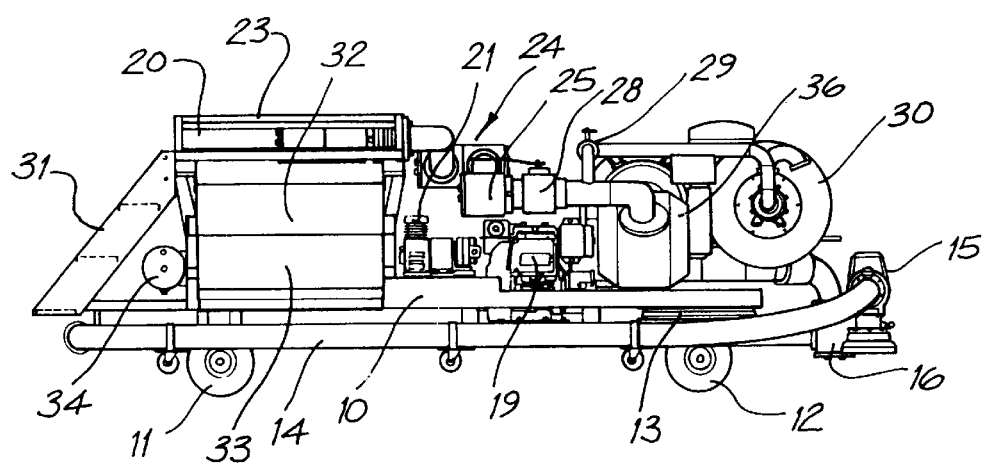
FIG. 4 is a side elevation of the cart of FIG. 1 with the platform fully lowered.
Figure 5:
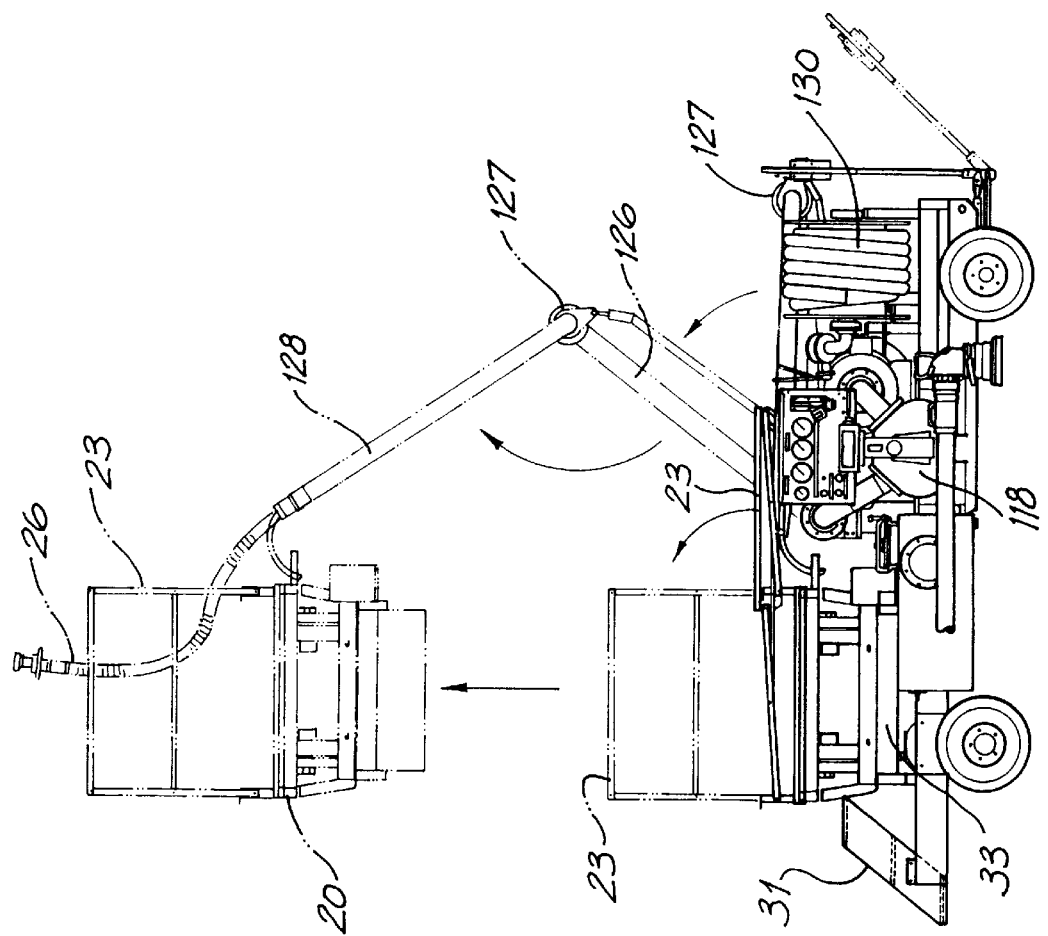
FIG. 5 is a side elevation of a second embodiment of the invention incorporating a separately operable refuelling boom, with the platform supporting scissors removed for clarity.

The refuelling platform 20 is raised and lowered by means of a scissors mechanism 22. To minimize the height of the cart when the platform is fully lowered, handrails 23 are pivotally collapsible as shown in FIG. 5 in relation to the second embodiment to be described below. In FIG. 4 the rails are shown fully collapsed. This enables the cart to be used for servicing aircraft having the greatest wing height currently in use or planned, while being able to be contracted to an overall height of approximately 132 cm.

In this first embodiment of the invention, fuel to the platform 10 is carried by a boom 24 consisting of lengths of rigid we coupled by pivoting couplings 25, the boom being supported by the platform 20. The folding boom thus created is mounted athwart the cart to hinge in the same direction as the scissor mechanism, 22, contributing to the compactness of the design. At the platform 20, fuel hoses 26 are coupled at 27 to the upper pivoting coupling 25, while the lower coupling 15 is fed from a platform hose valve 28 connected with the meter 36. Access to the platform is obtained by means of rear steps 31.

Below the platform in its lowered position space is provided for a hydraulic oil reservoir 32 and a fuel collector tank 33. Compressed air tanks 34 are located beneath the steps 31.

Also connected with the meter 36, through a hose reel valve 29. is a hose reel 30 of the drum type, which may be provided with a hydraulic rewind motor (not shown).

Because the platform provides the support for the folding boom 24, the platform must remain in position while the fuel hoses are engaged with the aircraft. The platform operating mechanism is therefore interlocked with the fuel supply so that the platform cannot be lowered during refuelling.

The drawbar 37 is preferably provided adjacent its free end with a control unit and handle coupled with the hydraulic motor drive so that the cart may be driven and steered by one operator, in its movement on the apron, for example, from one side of the aircraft to the other in refuelling. The engine 19 is of sufficient power only to move the cart at approximately 10–15 mph (16–24 kph), and apart from its function in driving the hydraulics and the air compressor, is intended to provide motive power only for maneuvering the cart in the region of the aircraft. Where it is necessary to transport the cart, for example for maintenance, it is towed by another vehicle, or moved by means of a trailer.

It is on occasions necessary to interrupt the refuelling process, for example when it becomes necessary due to changes in weather conditions or aircraft loading, to recalculate the necessary fuel load. In these cases it is desirable that the operator be able to descend until fuel delivery is recommenced. This is not conveniently done in the case of the first embodiment of the invention just described, since the platform cannot descend without lowering the boom 24, necessitating the disconnection of the fuel hoses 26. The embodiment illustrated in FIGS. 5–7 addresses this issue, by providing a boom which can be raised and lowered independently of the platform 20.

Figure 7:
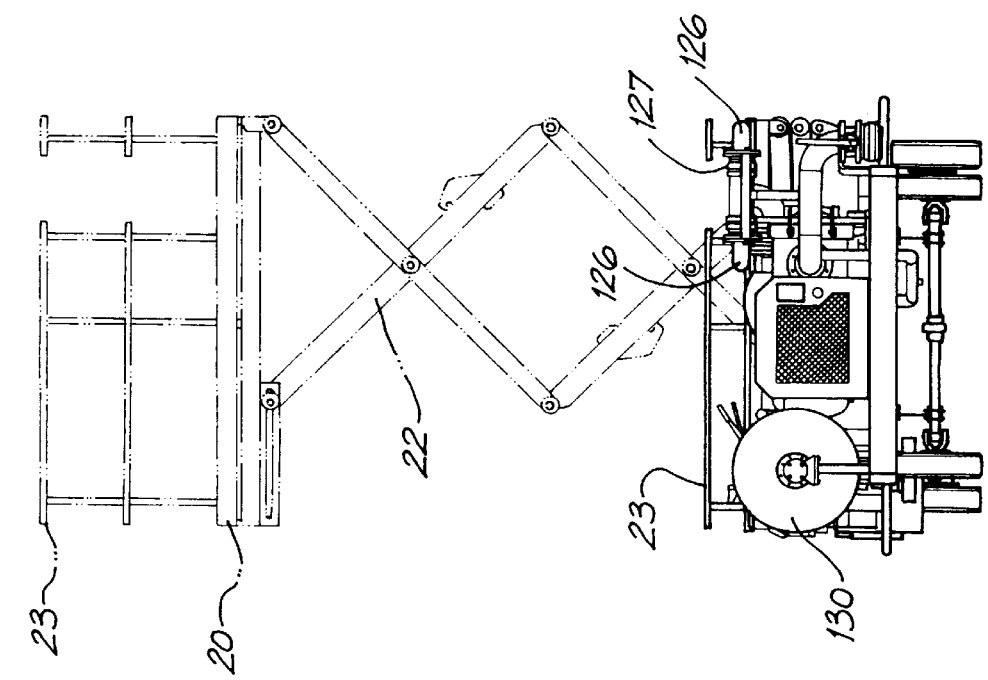
FIG. 7 is an end elevation of the cart with the platform and refuelling boom raised.
Figure 6:
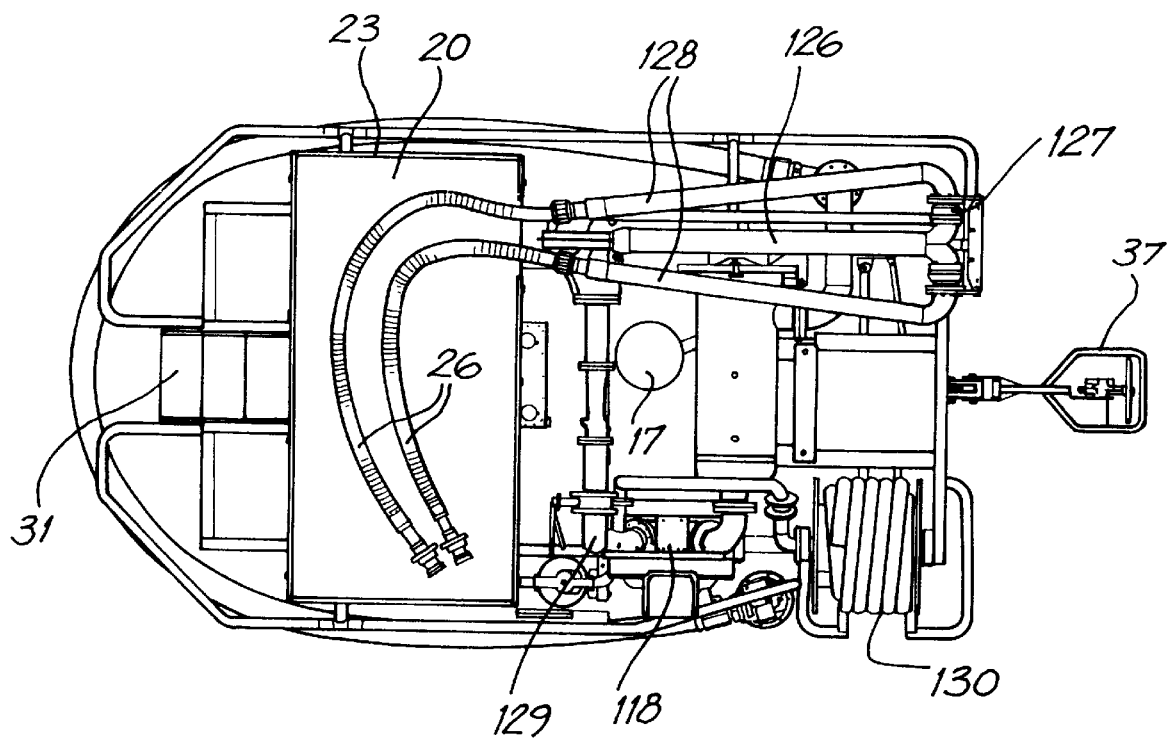
FIG. 6 is a plan view of the cart of FIG. 4.

In FIGS. 5–7 components corresponding to those of the first described embodiment are similarly numbered, and not further described, although it will be observed that components are rearranged to allow for the location of the refuelling boom. In this second embodiment the refuelling boom 125 is raised and lowered by the platform, but when refuelling, will stay in the up position while the platform can be lowered and raised independently of the boom. After the refuelling has stopped and all the refuelling nozzles have been stowed, the boom can be lowered with the platform. It will be seen that the boom is mounted with its pipes aligned parallel to the longitudinal axis of the cart, and includes a lower, common pipe 126 coupled by means of pivoting couplings 127 to a pair of upper boom pipes 128. The lower pipe 126 is fed from the meter 118 which, like the hose reel 130 is now moved to the side of the cart remote from the boom assembly, by means of lateral piping 119, and to allow for this the engine and compressor unit 119 is moved to underlie the boom assembly in its folded position as shown in FIG. 6. Fuel hoses are provided in connection wait the respective ends of the upper boom pipes 128. These hoses and the accompanying hose connectors will normally rest on the platform 20 and the hydraulic drive for the boom pipes will be derived from the engine and pump 119.

By combining their design features in the manner described, the hydrant carts of the present invention are believed to satisfy the varied requirements of major airport refuelling. The carts are capable of relatively inexpensive manufacture and thus may be purchased in the numbers required for an airline to have a cart at each of its bays at the terminal, while providing the wing height range and maneuverability necessary if the cart is to be capable of servicing all the aircraft which may use the bay at which it is stationed.

The platform when fully raised will be stable with 90 mph (145 kph) wind load or jet blast without the addition of ground support stabilizers and will remain stable in accordance with the statutory requirements for ground support equipment.

It will be appreciated that the embodiments of the invention have been described herein by way of example only, and the construction of the cart may be varied without departing from the spirit and scope of the invention.

What is claimed is:

1. An aircraft refuelling cart, comprising:

a chassis having ground-engaging wheels, a refuelling platform for supporting an aircraft refueling person or persons and being mounted to the chassis, means for raising and lowering the platform with respect to the chassis, a hydrant hose connected to the chassis and having a coupler for connection to an airport fuel hydrant, a fuel conveying boom which receives fuel from said hydrant hose, the boom being mounted to the chassis and being extendable and retractable vertically and capable of conveying said fuel, and a fuel hose coupled to an upper end of said boom and receiving fuel therefrom, the hose including fuel delivery means accessible by an aircraft refuelling person upon the platform for attachment to an aircraft to convey fuel thereto, wherein means are included for raising and lowering the platform and the boom independently of each other.

2. The cart of claim 1 wherein the refuelling platform is mounted to the chassis by means of one or more scissor-action mechanisms, each including a plurality of pivotally interconnected support members.

3. The cart of claim 1 wherein the boom includes a plurality of rigid segments pivotally coupled end-to-end.

4. The cart of claim 2 wherein the boom includes a plurality of rigid segments pivotally coupled end-to-end.

5. The cart of claim 4 wherein each segment of the boom resides adjacent to and is substantially parallel and co-extensive with a respective one of said support members.

6. The cart of claim 4 wherein the support members of the or each scissor-action mechanism pivot about respective parallel pivot axes and each segment of the boom resides in a plane or planes which is/are substantially parallel to said pivot axes.

7. The cart of claim 1 wherein the platform includes hand rails which are pivotally collapsible.

8. The cart of claim 1 wherein the boom is partly supported by the platform.

* * * * *